United States Patent [19]

Htsui

[11] 3,969,658
[45] July 13, 1976

[54] MOTOR AND CONTROL SYSTEM HAVING CYCLIC REVERSAL AND UNIDIRECTIONAL CAPABILITIES

[75] Inventor: John S. C. Htsui, Hazelwood, Mo.

[73] Assignee: Emerson Electric Co., St. Louis, Mo.

[22] Filed: Jan. 17, 1975

[21] Appl. No.: 541,798

[52] U.S. Cl. .......................... 318/202; 318/206 R; 318/227; 318/257; 318/282
[51] Int. Cl.² ........................................... H02P 1/40
[58] Field of Search ............. 318/202, 206 R, 227, 318/237, 256, 257, 281, 282

[56] References Cited
UNITED STATES PATENTS

| | | | |
|---|---|---|---|
| 3,334,284 | 8/1967 | Radtke | 318/206 R X |
| 3,368,381 | 2/1968 | Crane et al. | 318/281 X |
| 3,428,880 | 2/1969 | Muller | 318/257 |
| 3,543,118 | 11/1970 | Koenig | 318/257 X |

*Primary Examiner*—Gene Z. Rubinson
*Attorney, Agent, or Firm*—Polster and Polster

[57] ABSTRACT

A motor system and method of operation is disclosed which provides an electronically controlled motor operable from a single phase, AC power source, having adjustable unidirectional and reversing capabilities. The system includes a motor having a stator assembly and a rotor assembly. The stator assembly includes a core of stacked laminations constructed from magnetic material and a two phase winding constructed from a plurality of wire turns arranged in coils. The winding is placed in the stator assembly so that each edge of the individual coils, that is to say, the portion of the coil that extends longitudinally of the stator assembly, occupies a single slot of the stator core. The system also includes a rectifier circuit having novel means for providing signal source voltage, a silicon controlled rectifier (SCR) circuit exhibiting an improved method of providing current rate of change protection to the individual SCR devices, and a position sensing and motor reversal circuit which includes adjustable elements capable of varying the speed torque characteristic of the motor.

35 Claims, 8 Drawing Figures

MOTOR AND CONTROL SYSTEM HAVING CYCLIC REVERSAL AND UNIDIRECTIONAL CAPABILITIES

BACKGROUND OF THE INVENTION

This invention relates to dynamoelectric machines, and in particular, to a novel motor system which develops high torque, instantaneous rotation reversal and simple speed control.

For some time, motor manufacturers have attempted to develop new motor systems for use in high volume appliances. One such motor system is disclosed in a copending United States application of the present inventor, U.S. Ser. No. 395,187, filed Sept. 7, 1973, now U.S. Pat. No. 3,858,098. The system disclosed in Ser. No. 395,187, like the invention disclosed hereinafter, provides a motor system operable continuously in either of two directions of rotation and permits instantaneous reversal between those rotational directions. This type of operation is particularly suitable for certain high volume consumer appliances. Thus, the systems may find application in a conventional washing machine, where cyclic rotation reversal of the motor is equivalent to an agitation or washing mode, and the continuous unidirectional run condition of the motor corresponds to the spin dry cycle of the appliance. Because of the unique motor operating characteristics, the motor may be connected mechanically to drive the wash basket directly, eliminating the need for transmissions now commonly found in washing machine applications. The invention described hereinafter, while dealing broadly with the same subject matter as Ser. No. 395,187, exhibits a number of improvements over previously known electronically controlled motors, in both the motor and circuit design aspects of the system.

Other prior art dealing with electronically controlled motors include, for example, the SCR manual, Fourth Edition, 1967, published by the General Electric Company; Principles of Inverter Circuits, John Wiley and Sons, Inc., 1964, by B. D. Bedford and R. G. Hoft; Complimentary Impulse Commutator Inverter, by R. Young, Poughkeepsie Lab., Technical Report TROO, 1973, dated Jan. 30, 1973, I.B.M.; and the U.S. Patents to Greenwell, No. 3,780,324, issued Dec. 18, 1973, and Offutt, No. 3,802,091, issued Apr. 9, 1974.

While this body of prior art generally discloses the use of electronic circuit means for controlling the operation of a dynamoelectric machine, very little information presently is available relating a motor which is continuously reversing its direction of rotation as a normal mode of motor operation. Under general motor design principles, it is highly desirable that the per unit current torque, of both the unidirectional and the reverse braking varieties, be as high as possible. Besides the obvious desirable feature of high torque from the application standpoint, if high per unit current torque can be obtained, the SCR circuits utilized in conjunction with motor operation need not be designed for high current handling capabilities and the cost of the motor system can be reduced appreciably.

The invention dislosed hereinafter utilizes an SCR circuit for controlling the application of electrical energy to a motor. The motor itself has a unique winding designed to deliver high per unit current torque. A position sensor used in conjunction with the motor is provided which includes adjustable elements for adjusting the speed torque characteristic of the motor. In addition, the control circuitry disclosed incorporates a number of improvements including means for limiting the current rate of change seen by the individual SCR elements, and a novel circuit arrangement for providing dual outputs from a single electrical input which operate independently of one another.

One of the objects of this invention is to provide an improved motor control system.

Another object of this invention is to provide a circuit arrangement for providing signal source voltage and motor voltage independent from one another from a single electrical input.

Another object of this invention is to provide an improved SCR circuit for controlling application of electrical energy to a dynamoelectric machine.

Still another object of this invention is to provide a position sensing device and reversing mechanism which is adjustable to vary the speed torque characteristic of a motor.

Other objects of this invention will be apparent to those skilled in the art in light of the following description and accompanying drawings.

SUMMARY OF THE INVENTION

In accordance with this invention, generally stated, a motor system is provided that is capable of both unidirectional and bidirectional rotation and instantaneous direction reversal. A motor has a stator assembly including a core of magnetic material having a plurality of slots formed in it, and a two phase winding constructed from a plurality of wire turns arranged in coils. Each coil has a longitudinally extending portion and an end turn portion. The longitudinal portions of each coil occupies a separate slot of the stator core. A single rectifier circuit means is provided which supplies two power outputs, one to the motor and one to a position sensing and motor reversing circuit. The rectifier circuit means is designed so that the two power outputs are independent of one another. A silicon controlled rectifier (SCR) circuit is electrically connected to the position sensing and motor reversing circuit. The SCR circuit includes a novel arrangement for providing current rate of change protection to the individual SCR devices. The position sensing and motor reversing circuit is utilized to regulate the on times of individual elements of the SCR circuit. The position sensing portion also incorporates adjustable elements capable of varying the speed torque characteristic of the motor.

DESCRIPTION OF THE PREFERRED EMBODIMENT

Figure 1:
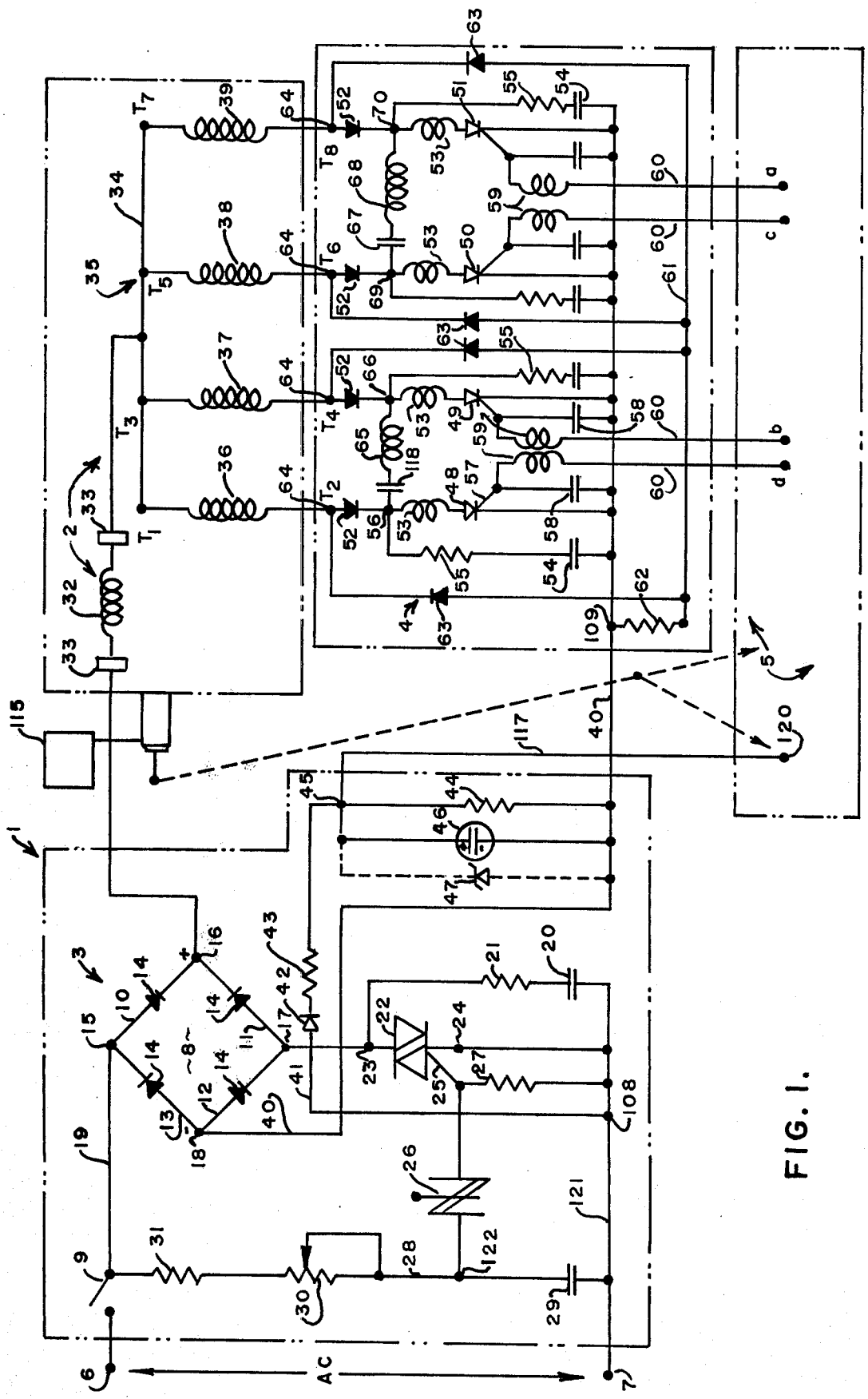
FIG. 1 is a diagrammatic representation of one illustrated embodiment of motor system of this invention.

Referring now to FIG. 1, reference numeral 1 indicates one illustrated embodiment of motor system of this invention. The motor system 1 includes a motor 2, a rectifier circuit 3, an SCR circuit means 4, and a position sensing and reversing circuit 5.

The motor system 1 has a pair of input terminals 6 and 7 respectively which are connected to a source of AC power, not shown. One side of a full wave bridge rectifier 8 is connected to the terminal 6 through an on/off switch 9. The bridge 8 includes legs 10 through 13, each of which have individual ones of a plurality of diodes 14 connected in a conventional manner so as to define AC connection nodes 15 and 17, and DC connection nodes 16 and 18. The node 15 is the side of the bridge 8 connected to the terminal 6 through the switch 9 by a conductor 19. A triac 22 has a terminal 23 electricaly connected to the node 17, and has a terminal 24 connected to a conductor 121. Conductor 121 is electrically connected to the input terminal 7. A resistor 21 and a capacitor 20 are connected in series with the conductor 121 between the terminal 23 and the terminal 24 sides of the triac 22. A gate electrode 25 of the triac 22 is connected to a first side of a silicon bilateral switch 26. A resistor 27 also is connected between the gate electrode 25 and the conductor 121. A second side of silicon bilateral switch 26 is connected to a conductor 28 at a node 122 which in turn is connected to the conductor 121 through a capacitor 29 and to a first side of a variable resistor 30. A second side of resistor 30 is connected to the switch 9 through a resistor 31.

The node 16 of bridge 8 is electrically connected to a rotor winding 32 of the motor 2 through a pair of brushes indicated generally by the numeral 33, and to a winding 34 of a stator assembly 35 of the motor 2. The brushes 33 are conventional and are not described in detail. As later set forth, the winding 34 includes four winding segments 36 through 39, respectively.

A conductor 41 is connected to the conductor 121 at a node 108 and to an anode of a diode 42. The cathode of diode 42 is connected to a node 45 through a resistor 43. A capacitor 46 and a resistor 44 are connected in parallel between the node 45 and a conductor 40. The conductor 40 is connected to the negative node 18 of the bridge 8. As described in more detail hereinafter, a zener diode 47 may be connected in parallel with the capacitor 46 and the resistor 44 between the node 45 and the conductor 40. A conductor 117 is electrically connected to the node 45 and supplies signal voltage power to the position sensing and reversing system 5 at an input terminal 120.

The conductor 40 also is electrically connected to the SCR circuit 4, serving as a common negative for that circuit. As later described in detail, and as observable in FIG. 1, a rectifier system is disclosed in which a DC voltage is supplied to the motor 2 and is controllable by the rectifier system 4 which voltage is adjusted by the operation of the triac 22 and resistor 30, while signal voltage is applied to the position sensing and reversing circuit 5 independently of voltage application to the motor 2 and SCR circuit 4.

The SCR circuit 4 includes four SCR devices 48, 49, 50 and 51 having their anodes connected to the winding segments 36, 37, 38 and 39 respectively through a diode 52 and an inductor 53. While each of the SCR devices 48, 49, 50 and 51 and related circuit components generally are similar to one another, certain specific circuit arrangements require that the entire SCR circuit mean 4 be described in more detail than might be necessary from either function or operation standpoints. However, like numerals are used for like components where appropriate. For example, the inductor 53 is important in that it has been found that use of the inductor 53 in the position sown and described provides better protection for the SCR devices against high current rate of change than other arrangements used in analogous circuit designs. The cathode of each of the SCRs 48 through 51 is electrically connected to the conductor 40.

A capacitor 54 and a series resistor 55 are connected between the conductor 40 and a node 56 located on the anode side of the SCR 48 between the diode 52 and the inductor 53. Similar arrangements of the resistor 55-capacitor 54 series circuit are connected between the conductor 40 and nodes 66, 69 and 70 located on the anode sides of SCRs 49, 50 and 51 respectively. A gate electrode 57 is connected to the conductor 40 through a capacitor 58 and to the position sensing and reversing circuit 5 through an inductor 59 and a conductor 60. The capacitor 58 serves as a harmonic filter and reduces application noise to insure that the SCR circuit means 4 is not triggered falsely.

A coasting path for load current includes a conductor 61 and a resistor 62 which are connected to the conductor 40 and a connection point 109. Individual ones of a plurality of diodes 63 are connected between the conductor 61 and a node 64 on the anode side of diode 52 for each of the SCR devices 48, 49, 50 and 51.

A capacitor 118 is connected in series with an inductor 65 between node 56 and the node 66, on the anode sides of SCRs 48 and 49. A similar series arrangement of a capacitor 67 and an inductor 68 is connected between the nodes 69 and 70 on the anode sides of the SCRs 50 and 51.

Figure 4:
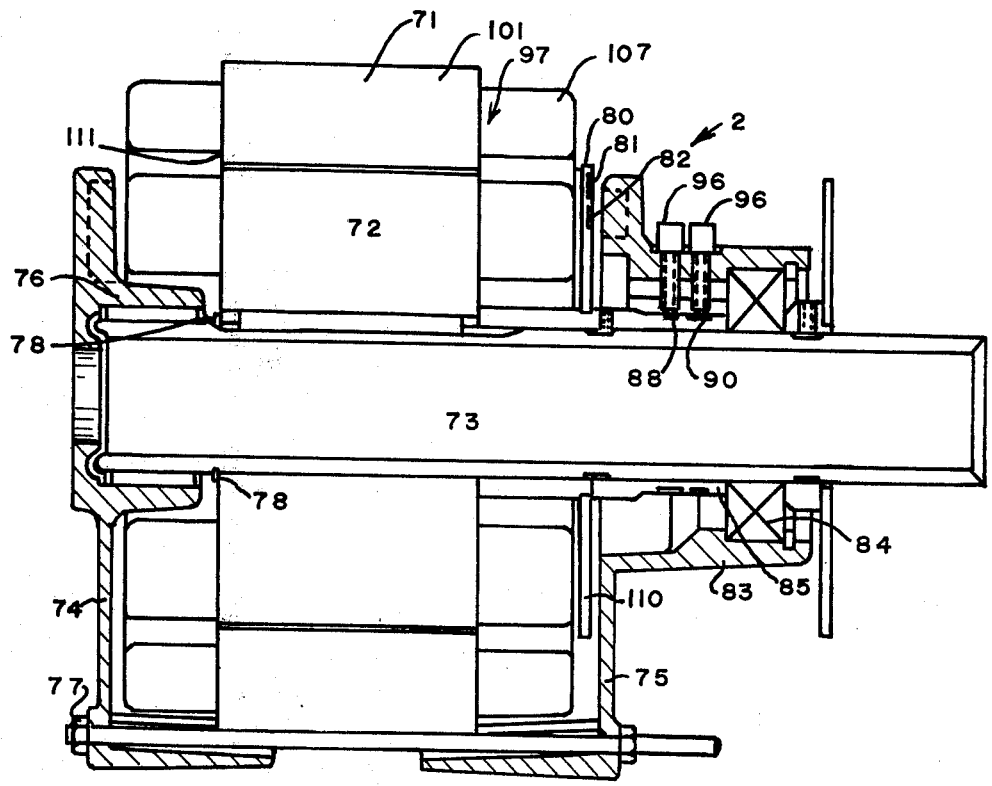
FIG. 4 is a sectional view of a motor useful in the motor system of this invention.
Figure 7:
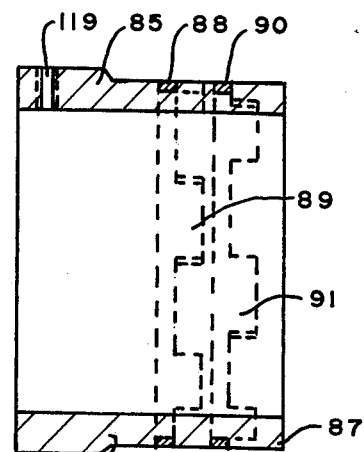
FIG. 7 is a cross sectional view of an adjustable sensor element used in conjunction with the position sensing and motor reversing circuit shown in FIG. 2.

Elements of the position sensing and reversing circuit 5 are best described with reference to FIGS. 2, 4, and 7. As shown in FIG. 4, the motor 2 includes a stator assembly 71, and a rotor assembly 72 mounted to a shaft 73. The shaft 73 is journalled for rotation along a first end shield 74 and a second end shield 75.

End shield 74 is conventional and includes a central hub portion 76 which receives one end of the shaft 73. The end shields 74 and 75 may be joined to the stator assembly 71 and the rotor 72 by any convenient method. Conventional threaded fasteners, indicated generally at 77, inserted through the end shields and through or along the ouer diameter of the stator assembly 71 work well, for example. A retaining ring 78 is positioned inboard of the hub 76 which acts to limit axial movement of the shaft 73 rotor 72 combination and to maintain the proper alignment of the rotor 72 and stator 71.

A slip ring assembly 80 is mounted for rotation with the shaft 73 and is positioned inboard of the end shield 75. The assembly 80 includes a disc body 110 having a first ring 81 and a second ring 82 formed on it. The rings 81 and 82 are conductive electrically and the ring 82 is disposed coaxially inwardly of the ring 81. The brushes 33 are mounted to the end shield 75 so that one each of the brushes 33 contacts an individual one of the rings 81 and 82. Location of the brushes on the end shield 75 may vary in embodiments of this invention. I find it convenient to mount the brushes 33 vertically through the end shield 75, although other arrangements are compatible with the broader aspects of this invention.

End shield 75 includes a central hub 83 which houses a bearing means 84. As indicated, bearing means 84 rotatably supports the shaft 73.

The position sensing and reversing circuit 5 includes a position sensing assembly 85 which is mounted to and is rotatable with the shaft 73 along the end shield 75 side of the motor 2. Assembly 85 includes a first member 86 and a second member 87, best shown in FIG. 7. The members 86 and 87 generally are cylindrical in cross section and are designed to be releasably rotatable with respect to one another. Means, for example, a set screw not shown and an opening 119 therefore, may be provided for securing the assembly 85 to the shaft 73.

The member 86 has a first circular electrically conductive ring 88 attached to it. The ring 88 has a plurality of position indicating, axially extending parts 89 integrally formed with it. Member 87 has a second circular, electrically conductive ring 90 attached to it. Ring 90 also has a plurality of position indicating axially parts 91 integrally formed with it. The members 86 and 87 preferably are constructed from a non-electrically conductive material, except for the rings 88 and 90 and their respective extensions 89 and 91, which preferably are copper or similar conductive material.

Figure 2:
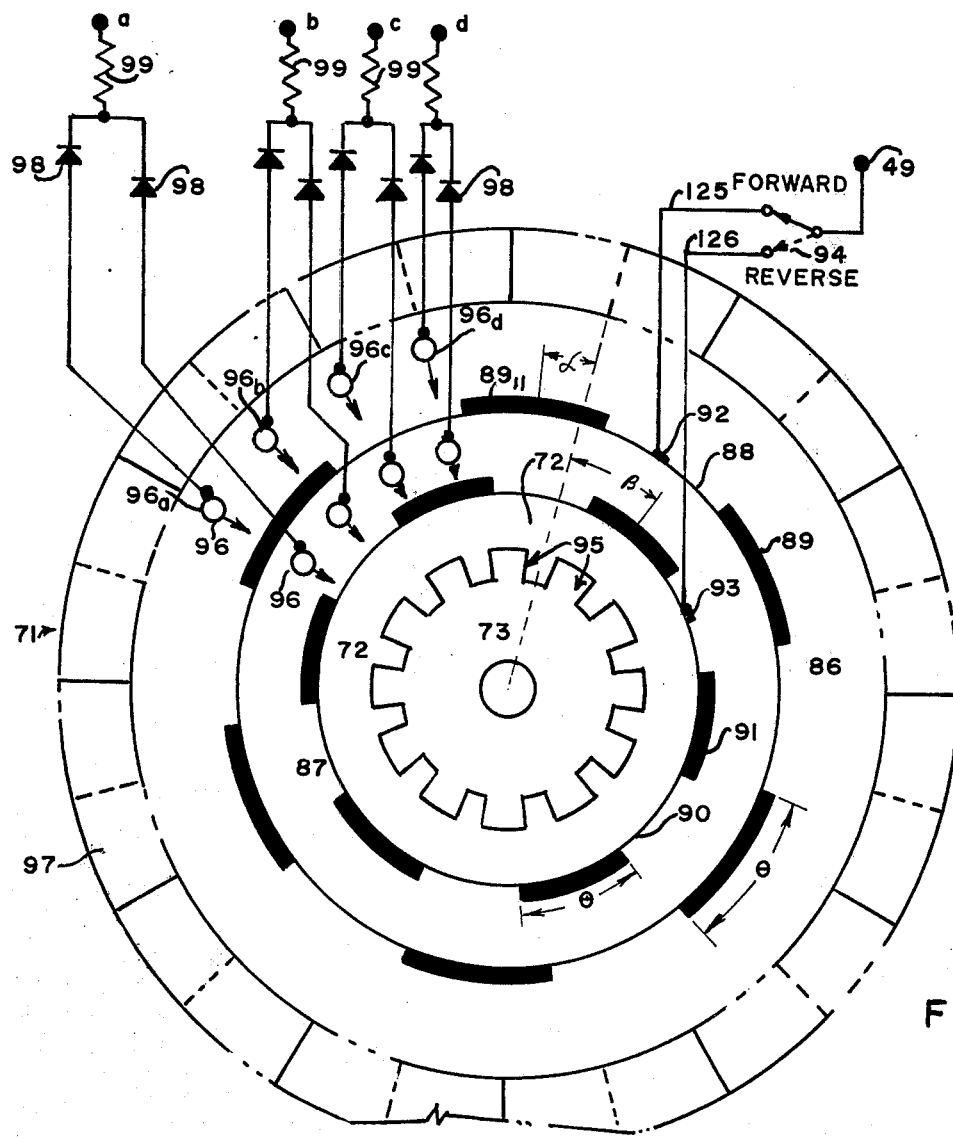
FIG. 2 is a diagrammatic representation of position sensing and motor reversing circuit utilized with the motor system of FIG. 1.

A diagrammatic illustration of the assembly 85 of FIG. 4 utilized in conjunction with a twelve pole, two phase winding is shown in FIG. 2. Individual poles of the two phase winding are positioned ninety electrical degrees apart, and are mounted on a core 104 of stator assembly 71. The rotor 72 is diagrammatically illustrated in FIG. 2 as a twelve pole wound rotor mounted on the shaft 73. The two members 86 and 87 of the position sensing assembly 85 also are mounted on the shaft 73. One is marked as the forward member for controlling rotation of the shaft 73 in a first direction, and another is marked as the reverse member for controlling rotation of the shaft in a reverse direction. Either member may function as the forward or reverse member, however, member 86 is designated as forward for purposes of description. The rings 88 and 90 are shown in axial aspect, while the axial extending parts are shown in plan. Again, this arrangement is used for purposes of description. The two rings 88 and 90 are energized through the two signal power brushes 92 and 93, electrically connected to a reversing switch 94 by a pair of electrical conductors 125 and 126 respectively. Switch 94 is conventional and is not described in detail. It may be located at any convenient location. Mounting the switch 94 on the end shield 75 works well, for example. In the embodiment illustrated, the brushes 92 and 93 are mounted through the hub 83. Brushes 92 and 93 may comprise any of a variety of commercially available devices and they are not described in detail. They appear in FIG. 2 and may be mounted on the end shield 75 at any convenient location. The brushes 92 and 93 ride on the continuous ring portions 88 and 90 of the respective members 86 and 87.

Figure 8:
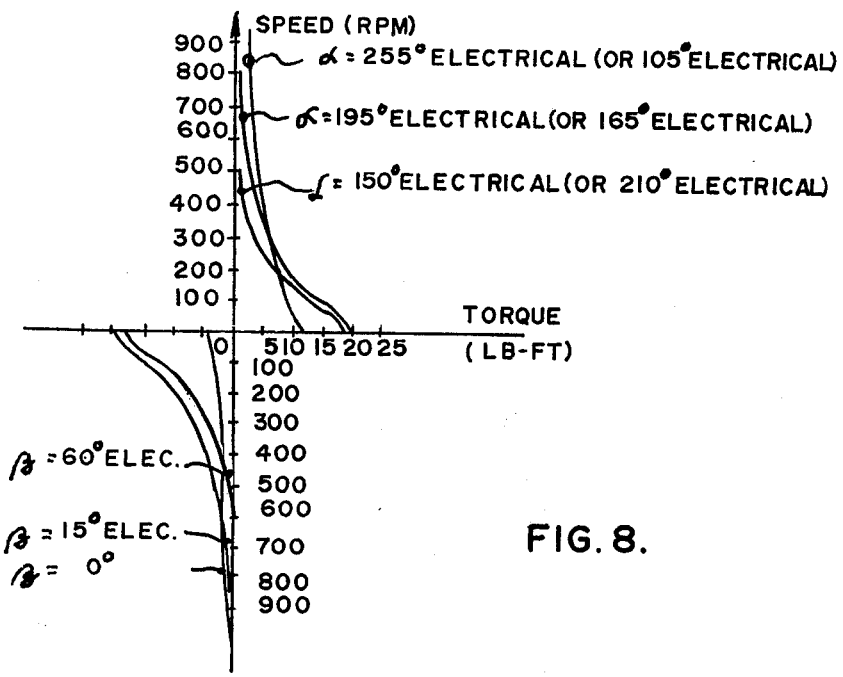
FIG. 8 is a diagrammatic representation of speed versus torque curves exhibited by the motor of FIG. 4 in both forward and reverse directions, illustrating the variations obtained in the speed torque characteristic curves of the motor as the sensor element of FIG. 7 is adjusted.

The angular position of the rings 88 and 90 are specified in FIG. 2 by the notations α (alpha) and β (beta), where alpha represents the angular distance from the center of the slot between two rotor poles 95 to the center of an extending part 89, and beta represents the angular distance from the center of an extending part 91 to the center of the slot between two rotor poles 95. The selection of the angles α and β directly influence the torque/speed characteristics of the motor. An example of the variations obtained is given in FIG. 8. As there illustrated, a set of torque/speed curves of a sample motor is plotted for different angles α and β. The summation of the angles α and β gives the angular distance between the two signal rings 88 and 90 as measured between the centers of two extending parts 89 and 91. The best operative region for this angular distance has been found to be in the range of 85° or 85°+N×360° to 275° or 275°+N×360° electrical degrees where N is an integer and equals a whole number. That is, the number N may be equal to one or more of the number of pole pairs for the motor 2. The extending parts of each of the rings 88 and 90, in the embodiment illustrated, are 360 electrical degrees apart as measured center to center. Consequently, any of the extending parts can be biased to set the relationship of the rings, i.e. choosing the angles α and β within the above ranges. Although the motor 2 still operates at angles other than those given, performance generally is not as good as motors having the rings 88 and 90 set within the range given. The number of extending parts 89 and 91 is equal to the number of pole pairs of the rotor assembly 72. Consequently, for the 12 pole rotor illustrated, six of the extending parts 89 and 91 are utilized. That is to say, six of the extending parts are used in conjunction with each of the rings 88 and 90. The angular width of the extending parts 89 and 91 is indicated by an angle θ (theta) and is equal to 360° divided by the number of poles.

The output of the extending parts 89 and 91 of the members 86 and 87 is sensed by a plurality of signal brushes 96 which are located along the center lines of predetermined ones of the poles of each phase of a stator winding 97. Stator winding 97 is described in detail hereinafter. For present purposes it is sufficient to note that the winding 97 is a two phase winding. That is, the winding includes two sets of wound coils defining a plurality of electrical poles which are predeterminately positioned with respect to one another. In the two phase motor diagrammatically shown in FIG. 2, the solid lines represent the phase 1 pole centers and the dotted lines represent the phase 2 pole centers. Two of the signal brushes 96 are located at each pole center for picking up the signals coming from the forward and the reverse signal rings 88 and 90. The brushes 96 ride on the parts extending 89 and 91 so that signal output from the members 86 and 87 is a pulse which is capable of initiating conduction of predetermined ones of the SCRs 48 through 51. Each set of the two signal brushes 96 located at a particular pole center are connected through a diode 98 and a resistor 99 to one of the gate electrodes of the SCRs 48, 49 50 and 51. That is, gate command is supplied from the signal brushes at 96 to the respective terminals a, b, c and d in FIG. 2 which correspond to the terminals a, b, c, and d shown in FIG. 1. Gate command turns certain ones of the SCRs devices on in accordance with the position of the rotor assembly 72. It also may be observed in FIG. 2 that the spacing between the axial extending parts 89 and 91 and the angular length of those extending parts are such that two of the brushes 96 will receive an input signal very nearly at the same time, so that the SCRs may be considered to operate in pairs. The diodes 98 are used to prevent electrical interferences between the rings 88 and 90 during operation of the motor 2, described hereinafter.

Figure 5:
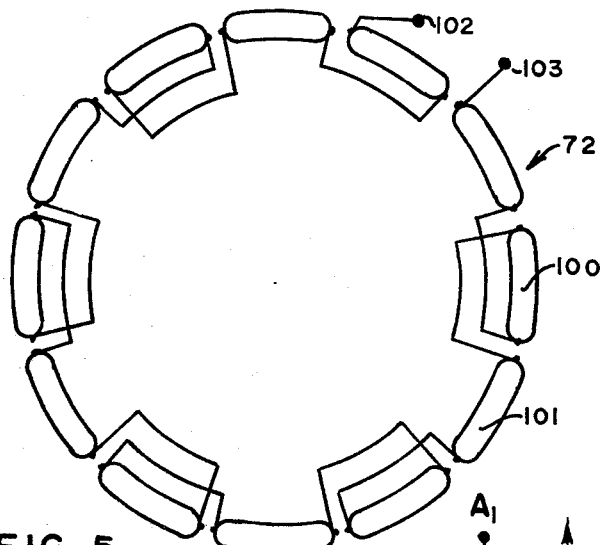
FIG. 5 is a winding diagram schematic for a rotor assembly of the motor shown in FIG. 4.

As indicated above, and diagrammatically illustrated in FIG. 5, rotor assembly 72 is a wound armature having a winding 100 arranged in slots of a plurality of stacked laminations not shown. Lamination design and slot configuration, while important in overall motor performance capabilities, form no part of this invention and are not described in detail. The winding 100 comprises a plurality of wire turns arranged in individual coils 101 and positioned in the slots of the rotor core. The coils 101 are serially connected and terminate in coil ends 102 and 103 which are electrically connected to the rings 81 and 82 of the slip ring assembly 80.

Figure 3:
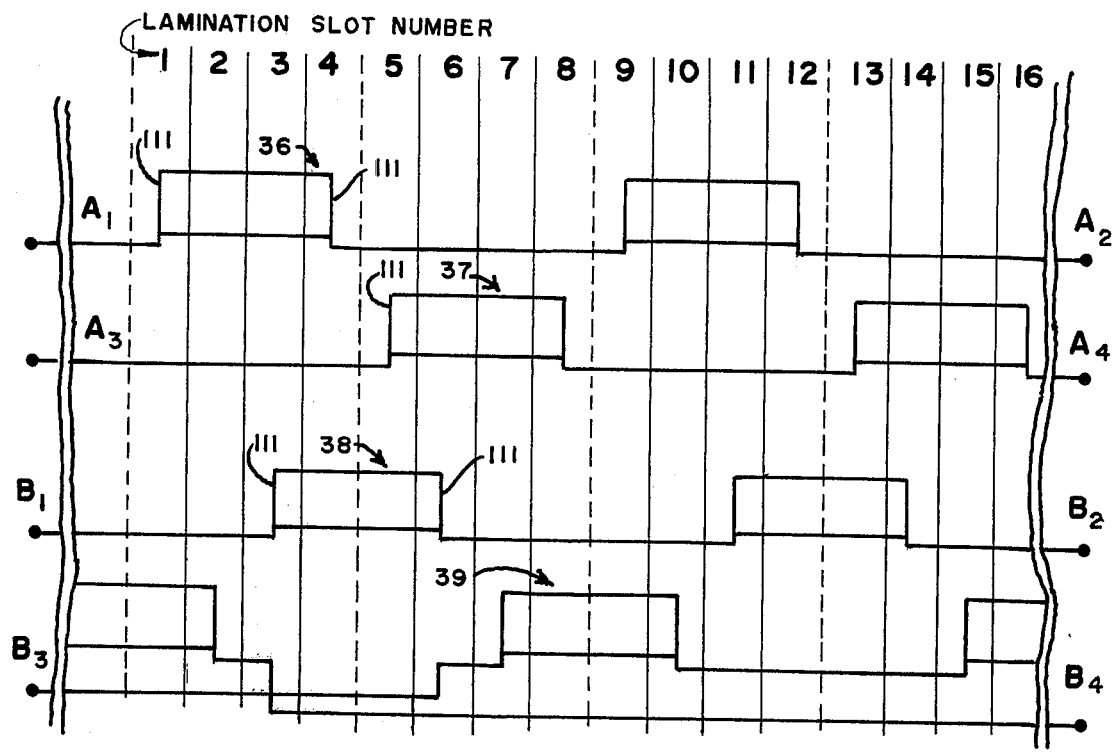
FIG. 3 is a diagrammatic representation of the winding distribution of a motor utilized in conjunction with the motor system of FIG. 1.
Figure 6:
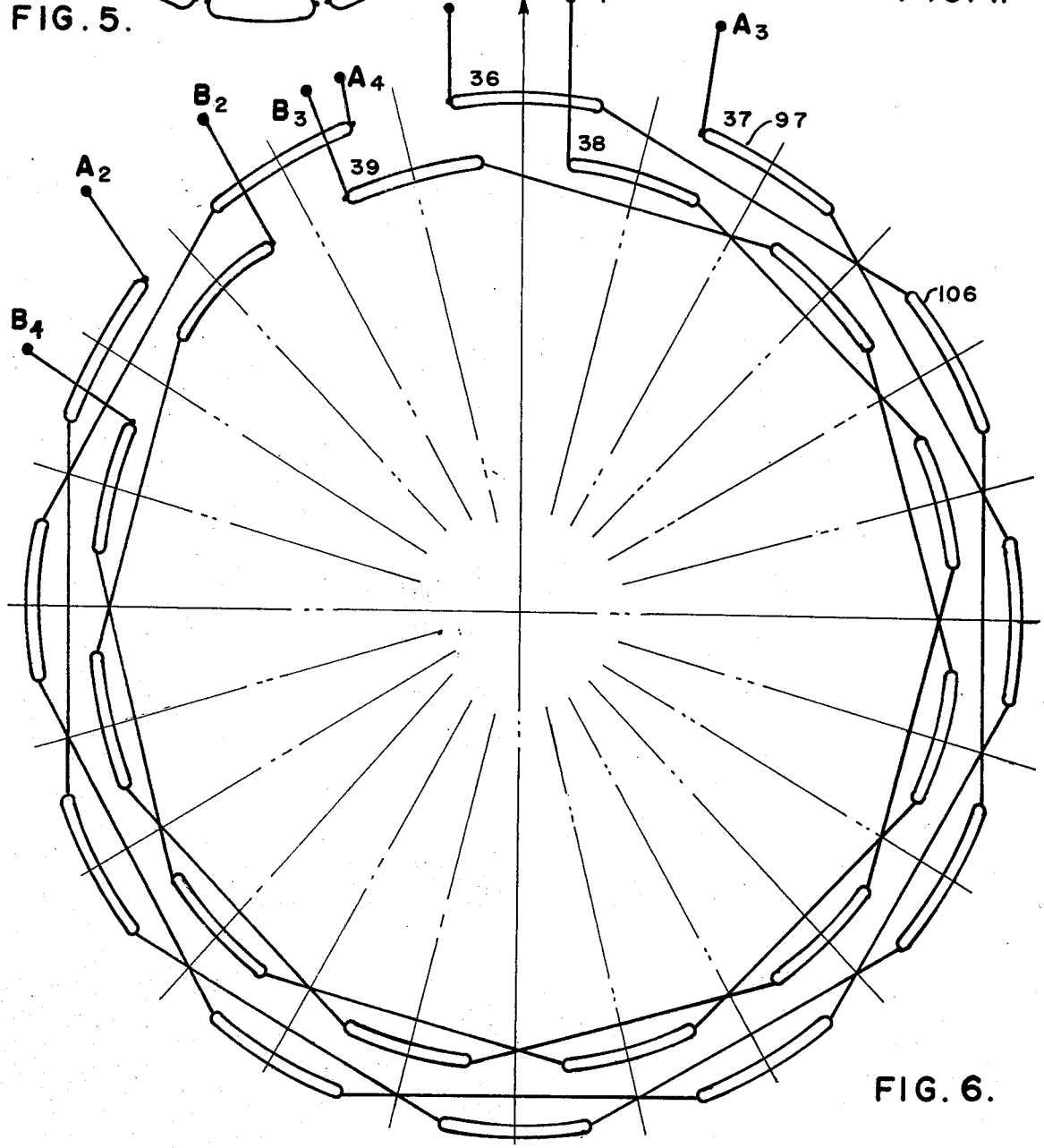
FIG. 6 is a diagrammatic representation of a wiring diagram for a stator assembly shown in FIG. 4.

The stator assembly 71 includes the core 104 constructed from a plurality of individual, stacked laminations, not shown. In the motor 2 illustrated and described, each lamination has a central, rotor receiving opening through it, and has a plurality of slots extending radially outwardly from the central opening. The slots also extend axially through the stacked laminations to define winding receiving receptacles. The stator assembly 71 also includes the stator winding 97. The winding 97 is constructed from a plurality of wire turns formed into individual coils 106. The coils 106 include end turn portions 107, best observed in FIG. 4, and axially extending portions contained in the slots of the individual laminations forming the core 104 which are generally indicated by the numeral 111 in FIG. 4. The particular lamintion utilized in conjunction with the motor 2 has 48 slots, and the winding 97 is positioned so that an individual one of the axially extending portions 111 of the coils 106 is positioned within a single slot of the lamination. That is, none of the coils 106 share slots with any other of the coils forming in the winding 97. The ends of the winding 97, shown in FIG. 6, as $A_1$ and $A_2$, $A_3$ and $A_4$; $B_1$ and $B_2$, $B_3$ and $B_4$; are electrically connected in FIG. 1 at $T_1$ and $T_2$, and $T_3$ and $T_4$, and $T_5$ and $T_6$, and $T_7$ and $T_8$, respectively. The coils 106 between the ends $A_1$ and $A_2$ constitute the winding segment 36 while those between $A_3$ and $A_4$ constitute the winding segment 37. In like manner, the coils between the ends $B_1$ and $B_2$ constitute the winding segment 38 while those between $B_3$ and $_4$ constitute the winding segment 39. The coil 106 placement within the core 104 is diagrammatically illustrated in FIG. 3. The arrangement shown in FIG. 3 is carried out only for 16 slots of the 48 slots lamination, but those skilled in the art will recognize the coil placement merely is repeated for those slots in excess of 16. The segments 36 and 37 of the winding 97 constitutes one pahse of that winding, while the segments 38 and 39 constitute a second phase of that winding. Each phase of the winding 97 has 12 of the coils 106 associated with it, six between each of the ends $A_1$ and $A_2$, $A_3$ and $A_4$, $B_1$ and $B_2$, and $B_3$ and $B_4$.

Operation of the motor system of this invention is simple. The motor 2 is installed in the desired application. As indicated above, the motor 2 has particular application when adapted for use in an appliance, in particular, to drive the wash basket of a conventional washing machine indicated generally by the numeral 115 in FIG. 1. In that application, the switch 94 may comprise a mechanical linkage which reverses the application of signal power to the members 86 and 87 after a predetermined angular movement, thereby altering the operation of the SCR circuit means 4 and reversing rotation direction of the rotor 73, and which may be locked in either of the two positions shown to permit rotor rotation in a single direction. This type of operation, of course, is directly comparable to the wash and spin modes of operation of conventional washing machines.

A single phase AC power source is connected to the terminals 6 and 7. The AC source is applied to the bridge rectifier 8 through the on/off switch 9 and the triac 22. The bridge 8 provides full wave rectification of the AC input and bridge 8 output is controlled by the triac 22. Application of the AC power through the switch 9 charges capacitor 29 through resistors 31 and 30. The rate at which capacitor 29 charges is adjusted by resistor 30. After capacitor 29 reaches a predetermined voltage, it discharges through the silicon bilateral switch 26 and resistor 27, thereby providing gate command to triac 22. Since triac 22 controls the AC input side of bridge 8, it also controls the DC output side of the bridge. The motor 2 operates similarly to a conventional series wound DC motor in that speed is directly proportional to the applied voltage. Since applied voltage is easily controlled by the circuit disclosed, it is evident that simple means for varying the speed of the motor 2 is provided.

An important feature of my invention is the circuit arrangement utilized to provide the supply voltage at the terminal 120. Upon activation of the switch 9, a current will flow through conductor 41, the rectifier diode 42 and resistor 43. The voltage at node 45 charges capacitor 46 until the breakdown voltage of zener diode 47 is reached, at which time capacitor 46 discharges through diode 47. Diode 42 is connected to the negative node 18 of bridge 8 through resistor 43 and the capacitor 46, resistor 44, diode 47 circuit between node 45 and the common negative conductor 40. Consequently, the rectifier circuit means 3 displays dual outputs, one variable for motor 2 speed control, and a second constant voltage for operating the position sensing and reversing means 5. The second output voltage is not affected by changes in the firing angle of the triac 22 because the diode 42 is connected to the AC power line conductor 19, while a simple circuit arrangement is made possible because of the use of the common negative connection to the negative node 18 of bridge 8 through the conductor 40. When a constant and smooth signal power voltage is not required, the zener diode 47 may be omitted, and for this reason, diode 47 is illustrated in phantom lines.

As indicated above, terminal 120 is connected to rings 88 and 90 through the brushes 92 and 93. Rotational direction of a DC motor 5 may be changed in a variety of ways, for example, reversing the polarity applied to either the armature or the field winding of a conventional DC motor will reverse the rotational direction of the motor. This principal is applied in the motor 2, by use of the switch 94 and position sensing means 5 to energize certain ones of the winding segments 36 through 39, depending upon which direction of rotation is desired. Switch 94 in addition preferably is adapted to permit either cyclic reversal or continuous rotation of the rotor assembly 72. It is thus evident, that cyclic reversal of the motor 2 corresponds directly to the washing mode of the present day convenional washing machines, while the continuous rotation corresponds to the spin cycle of those machines. Energization of the winding segments, 37, 38, 39 and 40 is dependent upon position of the rotor assembly 72. That is to say, the signal brushes 96 initiate the gate signal for the SCR devices 48 through 51 which in turn determine which of the winding segments are energized. With the switch 94 in the position shown full line in FIG. 2, power will be applied to the ring 88. Two signal brushes 96a and 96b of the brush plurality 96, because they are in contact with an axial extending part 89 of the ring 88, will be energized and develop a voltage at terminals a and b. Terminals a and b provide gate command for SCRs 49 and 51, so that these SCRs will be gated on. As the rotor assembly 72 continues to rotate, the succeeding extending part 89 will come into contact with brushes 96c and 96d of the brush plurality 96, which provides gate signal voltage at terminals c and d, while the proceeding extending part 89 moves out of contact with brushes 96a and 96b, removing gate command from terminals a and b. It should be noted that the voltage and current at terminal 120 are extremely low as compared to the voltage supplied to the motor 2. Consequently, problems inherent in prior art systems arising because of the interruption of high voltage and current circuits are not a factor in the operation of the motor 2.

The SCR circuit system 4 is conventional in that it provides an SCR device for each of the winding segments 36 through 39. When gate command is present at terminals a and b, SCRs 49 and 51 conduct, permitting current flow through the winding segments 37 and 39 to the negative supply terminal node 18 of bridge 8 via conductor 40. SCRs 49 and 51 are commutated by removing their gate command and gating SCRs 48 and 50 to an on condition. Initial conduction by SCRs 49 and 51 will change capacitors 118 and 67. Taking the SCR 48 and 49 branch as an example, conduction by SCR 48 will discharge capacitor 118, thereby providing commutation current for SCR 49, turning that device to an off condition through a loop path comprising capacitor 118, SCR 48, conductor 40, SCR 49, and inductors 53 and 65. Those skilled in the art will recognize that while the turn on and turn off times of an SCR device is described as instantaneous, in actuality, the turn off time extends over some time period before the SCR device actually is in a final off condition. During this time period, it is common to provide a coasting path for the load current. I have found that the use of the resistor 62 in the coasting path to be beneficial in that initially current for communicating the on SCR will flow in the loop path described. Once commutation begins, however, the load current may transfer to the coasting path of resistor 62, conductor 61 and diode 63. This same operation cycle is repeated when SCR 48 is commutated and also is applicable to the SCR 50 and 51 branch operation.

It is thus evident that the motor system disclosed is one well adapted to attain all the ends and objects set forth, together with other advantages which are obvious and which are inherent to the structure disclosed.

Numerous variations, within the scope of the appended claims, will be apparent to those skilled in the art in the light of the foregoing description and accompanying drawings. For example, some latitude is permissible in component selection and placement. As indicated, zener diode 47 may be utilized or not, depending on whether regulated input voltage to terminal 47 is desired. Likewise, the silhouette and design characteristics of motor 2 may vary in other embodiments of this invention. While the motor 2 was described as a twelve pole motor, other electrical pole configurations are compatible with the broader aspects of this invention. Merely by way of example, the following components are suitable for use in the circuit illustrated in FIG. 1.

| Component Reference No. | Reference/ Manufacturer |
| --- | --- |
| Diodes 14 | 25 A. 400V. EDAL-E4-AL-25-40 Bridge |
| Traic 22 | 10A. 600V. RCA 40796 |
| Silicon bilateral switch 26 | 2N4993 G.E. |
| Capacitor 29 | 0.1MFD. 400V. |
| Resistor 30 | 500K ohms. |
| Resistor 31 | 4.2K ohms, 2W. |
| Diode 42 | 1N5059 |
| Resistor 43 | 900 ohms, 10W |
| Diode 47 | 1N1769, 8.2V. |
| Capacitor 46 | 150 MFD., 35V. |
| Resistor 44 | 220 ohms, 2W. |
| SCRs 48, 49, 50 and 51 | 8A. 400 V. IS48 HUTSON |
| Capacitors 118 and 67 | 3 MFD, 400V. |
| Inductors 65 and 68 | .0006 Henry |
| Inductors 53 | 10 Turns on 1/16"×1/16"×1/4" DIA CORE |
| Diodes 52 | 1N5107 G.E. |
| Resistor 62 | 1 ohms. 10W. |
| Diodes 63 | 1N5059 GE. |
| Diodes 98 | 1N914 |
| Resistors 99 | 150 ohms. 1/2W. |

While conventional brushes were utilized for signal brushes 96, other forms of generating the gate signal may be utilized, if desired. For example, other embodiments of this invention are contemplated where Hall effect generators are utilized for gating the SCR devices into conduction. While various connection points were illustratively described as "Nodes," those skilled in the art will recognize that the diagrammatic illustration of a connection node merely facilitates the verbal discription of the circuit diagram under consideration and that individual nodes maybe combined into single connection points and need not appear as actual nodes in embodiments of this invention.

These variations are merely illustrative.

Having thus described the invention, what is desired to be secured by Letters Patent is:

1. In a device having a member driven in at least two operation modes, one of said modes being a constant cyclic reversal movement occuring at some predetermined interval of rotational movement of said member, and the other of said modes being a continuous rotation of said member in a preselected direction, the improvement which comprises dynamoelectric system means for driving said member in each of said operational modes, said dynamoelectric system means comprising a motor including a rotating member and a stationary member, means for supplying electrical energy to the said motor, said energy supplying means including a pair of input terminals, a rectifier bridge having a negative DC terminal, said rectifier bridge being electrically connected to said input terminal pair, said energy supply means providing a first output and a second output, said first output being variable to permit selective variation of motor speed, said second output being substantially constant, said negative terminal providing a common connection point for both said first output and said second output.

2. The improvement of claim 1 wherein said bridge further comprises a pair of AC terminals and a positive terminal in addition to said negative terminal, said energy supplying means further including a triac electrically connected between one of said AC terminals and one of said input terminals for said dynamoelectric system means, and said triac including a gate elctrode, a silicon bilateral switch having first and second sides, said first side being electrically connected to said gate electrode, and a series circuit including a variable resistor and a capacitor connected between said pair of input terminals, said second side of said silicon bilateral switch being electrically connected between said variable resistor and said capacitor, said variable resistor being adapted to vary the firing angle of said triac, thereby controlling the DC output of said bridge.

3. The improvement of claim 2 further characterized by a diode electrically connected to one of said input terminals, said diode providing a second output for said energy supply means.

4. The improvement of claim 1 wherein said stationary member of said motor comprises a stator assembly including a stator core constructed from a plurality of individual laminations of magnetic material, said stator core having an axial opening through it and a plurality of slots extending radially outwardly from said axial opening and being open thereto, and a winding in said slots, said winding comprising first and second phases, said first phase including first and second segments, said segments being formed from a plurality of coils constructed from a plurality of individual wire turns, said second phase comprising first and second segments, said segments being formed from a plurality of coils constructed from a plurality of individual wire turns, each of said coils having a straight conductor run portion extending for the axial length of said stator core, each individual axial length portion of said winding being placed in a single slot of said stator core so that only one individual axial length portion of said winding occupies one of said slots, pairs of said coils of said first and second phases defining a pole of said motor.

5. The improvement of claim 4 wherein the number of slots of said stator core equals two times the number of phases of the winding of said stationary member times the number of electrical poles of said winding.

6. The improvement of claim 5 further characterized by SCR circuit means electrically between the winding segments of said stationary member and the negative terminal of said bridge rectifier.

7. The improvement of claim 6 wherein said rotating member of said motor comprises a rotor assembly including a rotor core constructed from a plurality of individual laminations having a plurality of slots formed therein, said slots defining axial extending, winding receiving receptacles, a winding in said slots, and a shaft having said rotor assembly mounted thereto, said motor further including means for rotatably supporting said shaft mechanically connected to said shaft and said stator assembly, and position sensing means mounted to said shaft, said position sensing means including means for generating an output signal, said position sensing means being electrically connected to said SCR circuit means.

8. The improvement of claim 7 wherein said SCR circuit means comprises a plurality of SCR devices, individual ones of said SCR device plurality being electrically connected to respective ones of said winding segments, each of said SCR devices including a gate electrode electrically connected to said position sensing means, and a coasting path electrically connected from the cathode side of said SCR devices to the anode side of said SCR devices.

9. The improvement of claim 8 wherein each of said SCR devices has a current rate of change protector comprising an inductor electrically connected in series between the individual winding segment and the anode side of respective ones of said SCR device plurality.

10. The improvement of claim 9 further including a resistor, said resistor being connected in said coasting path between the common point of the anodes of said SCR devices and the cathode side of said SCR devices.

11. The improvement of claim 10 wherein said position sensing element comprises a member mounted to said shaft, said member including a pair of rings acting as the position sensing elements, two power brushes electrically connected to a switch, one each of said brushes being in mechanical contact with one of said rings, said rings having axially extending parts integrally formed with them, a plurality of signal brushes mounted to said motor, and adapted to ride on said axially extending parts, and a switch electrically connected to said second output of said energy supply means, said switch adapted to apply electrical energy to one of said rings through respective ones of said brushes.

12. The improvement of claim 11 wherein the number of said signal brushes is equal to four times the number of phases of said stator assembly winding.

13. The improvement of claim 12 wherein said signal brushes are located at adjacent pole centers of each phase of said stator assembly winding.

14. The improvement of claim 13 wherein said signal brushes are electrically connected through a diode to a resistor and to the gate electrode of an individual one of said SCR device plurality, the total number of gate signal outputs being equal to two times the number of phases of said stator assembly winding.

15. The improvement of claim 14 wherein the axially extending part of each of said rings has an angular width equal to the angle theta, where theta is equal to 360° divided by the number of poles of said stator assembly winding.

16. The improvement of claim 15 wherein said rings are positioned on said shaft at an angle alpha and beta measured from the center of a slot of said rotor core, the sum of the angles alpha and beta being chosen from a range between 85 and 275 electrical degrees.

17. The improvement of claim 15 wherein said rings are positioned on said shaft at an angle alpha and beta measured from the center of the slot of said rotor core, the sum of the angles alpha and beta being chosen from a range between 85+($N$) (360°) to 275+$N$(360°) electrical degrees, where $N$ is an integer.

18. A motor system comprising:
a power supply, said power supply including a first output and a second output, and means for varying said first output;
an electrical motor having a stator assembly and a rotor assembly, said rotor assembly including a rotor winding connected to said first output of said power supply, said stator including a stator winding connected to said first output of said power supply and to an SCR circuit means;
SCR circuit means having an input side connected to the winding of said stator assembly, and an output side connected to said power supply, said SCR circuit means including a plurality of individual SCR devices and gate circuit means for energizing said SCR devices;

means for detecting the position of said rotor, said position detecting means having an input side electrically connected to said second output side of said power supply, and an output side electrically connected to the gate circuit means of said SCR circuit means; and means for applying power from the second output of said power supply to said position detecting means so as to vary the direction of rotation of said rotor assembly.

19. The motor system of claim 18 wherein said stator assembly is further characterized by a stator core constructed from a plurality of individual laminations of magnetic material, said stator core having an axial opening through it defining a bore, a plurality of slots extending radially outwardly from said axial opening and opening into said bore, and a winding in said slots, said winding comprising a first phase and a second phase, said first phase including first and second segments, said segments being formed from a plurality of coils constructed from individual wire turns, said second phase comprising third and fourth segments, said third and fourth segments being formed from a plurality of coils constructed from individual wire turns, each of the coils of said segments having a straight conductor run portion extending for the axial length of said stator core, each individual axial length portion of each of said coils being placed in a single slot of said core so that only an individual axial length portion of said winding occupies one of said slots, pairs of said coils of said first and second phases defining an electrical pole for said motor.

20. The motor system of claim 19 wherein the number of slots of said core assembly equals two times the number of phases of the winding of said stator assembly times the number of electrical poles of said winding.

21. The motor system of claim 20 wherein said rotor assembly is further characterized by a rotor core constructed from a plurality of individual laminations having a plurality of slots formed therein, said slots defining axially extending, winding receiving receptacles, a winding in said slots and a shaft having said rotor assembly mounted thereto, said motor further including means for rotatably supporting said shaft, said position detecting means being mounted to said shaft, said position detecting means including means for generating an output signal, said output signal generating means being electrically connected to said gate circuit means of said SCR devices.

22. The motor system of claim 21 wherein said SCR circuit means comprises a plurality of SCR devices, individual ones of said SCR device plurality being electrically connected to respective ones of said winding segments, each of said SCR devices including a gate electrode electrically connected to said output generating means of said position detecting means, and a coasting path electrically connected from the cathode side of said SCR devices to the anode side of said SCR devices.

23. The motor system of claim 22 wherein each of said SCR devices has a current rate of change protector comprising an inductor electrically connected in series between the individual windings segment of said stator assembly winding and the anode side of respective ones of said SCR device plurality.

24. The motor system of claim 23 further including a resistor, said resistor being connected in said coasting path between the common point of the anodes of said SCR device plurality and the cathode side of said SCR device plurality.

25. The motor system of claim 24 wherein said position detecting means comprises a member mounted to said shaft, said member including a pair of rings acting as the position sensing elements, two power brushes electrically connected to a switch, one each of said brushes being in mechanical contact with one of said rings, said rings having axially extending parts integrally formed with them, and a plurality of signal brushes mounted to said motor and adapted to ride on said axially extending parts, and switch means, said switch means being adapted to apply electrical energy to one of said rings through respective ones of said brushes.

26. The motor system of claim 25 wherein the number of said signal brushes is equal to four times the number of phases of said stator assembly winding.

27. The improvement of claim 26 wherein signal brushes are located at adjacent stator pole centers of the first and second phases of said stator winding.

28. The motor system of claim 27 wherein said signal brushes are electrically connected through a diode to a resistor and to the gate electrode of an individual SCR device, the total number of gate signal outputs being equal to two times the number of phases of said stator windings.

29. The motor system of claim 28 wherein the axially extending parts of each of said rings has an angular width equal to an angle theta, where theta is equal to 360° divided by the number of poles of said stator winding.

30. The motor system of claim 29 wherein said rings are positioned on said shaft at an angle alpha and beta, respectively, said angles alpha and beta being measured from the center of a slot of said rotor core, the sum of the angles alpha and beta being chosen from a range between 85 and 275 electrical degrees.

31. The motor system of claim 29 wherein said rings are positioned on said shaft at an angle alpha and beta, respectively, said angles alpha and beta being measured from the center of the slot of said rotor core, the sum of the angles alpha and beta being chosen from a range between $85°+(N)(360°)$ to $275°+(N(360°)$ electrical degrees, where $N$ is an integer.

32. A motor system for operating a device including a member having at least two operational modes, one of said modes being a constant cyclic reversal movement occurring at some predetermined interval of rotation of said member, and the other of said modes being a continuous rotation of said member in a preselected direction, which comprises:

a power supply, said power supply having a first variable output and a second approximately constant output;

an electrical motor including a stator assembly having a stator winding, a rotor assembly rotatably mounted with respect to said stator assembly, said rotor assembly being mechanically connected to said member;

SCR circuit means including a plurality of individual SCR devices, said SCR devices having anode sides electrically connected to said stator winding and cathode sides electricaly connected to said power supply, and gate electrodes for energizing said SCR devices;

means for detecting the position of said rotor assembly and for generating a signal based on that position to energize preselected ones of said SCR devices through said gate electrodes; and means for applying power from said second output of said power supply to said position detecting and signal generating means, said power supply means adapted to vary the direction of rotation of said rotor assembly.

33. A motor system, comprising:

a stator assembly, said stator assembly including a stator core constructed from a plurality of individual laminations of magnetic material, said stator core having an axial opening therethrough, said axial opening defining a bore, a plurality of slots opening to said bore, and a winding in said slots;

a rotor assembly, said rotor assembly including a rotor core constructed from a plurality of laminations of magnetic material, said lamination plurality having winding receiving slots formed therein, and a winding in said slots;

power supply means operatively connected to said stator and rotor assembly;

a shaft, said shaft having said rotor assembly mounted thereto;

means for rotatably supporting said shaft;

means for determining the position of said rotor assembly, said positioning determining means comprising:

a first segmental ring mounted to said shaft, said first ring including a continuous annular ring portion and a plurality of spaced axially extending parts connected to said ring portion;

a second segmental ring mounted to said shaft, said second ring including a continuous annular ring portion and a plurality of spaced axially extending parts connected to said ring portion;

a first input power brush mechanically connected to said continuous portion of said first ring;

a second input power brush mechanically connected to said second continuous ring portion; and a plurality of position sensing brushes adapted to sense the passing of said axially extending parts of said rings, pairs of said sensing brushes being aligned with one another so as to read from one of said first and said second rings, each of said aligned brushes being electrically connected to the anode side of a diode, the cathode side of said diode being electrically connected to a resistor; and means responsive to said rotor assembly position determining means for controlling application of electrical energy through said stator assembly.

34. The motor system of claim 33 wherein the windings of said stator assembly comprise a first phase and a second phase, said first phase including a first segment and a second segment, said segments being formed from a plurality of coils constructed from a plurality of individual wire turns, said second phase comprising a third segment and a fourth segment, said third and fourth segment being formed from a plurality of coils constructed from a plurality of individual wire turns, each of said coils having a straight conductor run portion extending for the axial length of said stator core, each individual axial length portion of said coils being placed in a single slot of said stator core so that only one individual axial length portion of said core occupies one of the slots in said stator core, pairs of the coils of said first and second phases defining an electrical pole for said stator assembly.

35. The motor system of claim 34 wherein the number of slots of said stator core equals two times the number of phases of the windings of said stator assembly times the number of electrical poles of said winding.

* * * * *

UNITED STATES PATENT OFFICE
CERTIFICATE OF CORRECTION

Patent No. 3,969,658          Dated July 13, 1976

Inventor(s)      John S. C. Hsui

It is certified that error appears in the above-identified patent and that said Letters Patent are hereby corrected as shown below:

Column 4, line 15, "sown" should be "shown".

Column 4, line 57, "generrally" should be "generally".

Column 5, line 31, "parts 91" should be "extending parts 91".

Column 7, line 56, "pahse" should be "phase".

Column 8, line 67, "convenional" should be "conventional".

Column 11, line 5, "elctrode" should be "electrode".

Column 14, line 48, "275° + (N(360°)" should be "275° + (N)(360°)"

Signed and Sealed this

Thirtieth Day of November 1976

[SEAL]

*Attest:*

RUTH C. MASON
*Attesting Officer*

C. MARSHALL DANN
*Commissioner of Patents and Trademarks*